(12) United States Patent
Vinson et al.

(10) Patent No.: US 10,405,039 B2
(45) Date of Patent: *Sep. 3, 2019

(54) SYSTEM AND METHODS FOR ANALYZING CONTENT ENGAGEMENT IN CONJUNCTION WITH SOCIAL MEDIA

(71) Applicant: Rentrak Corporation, Portland, OR (US)

(72) Inventors: Michael Vinson, Piedmont, CA (US); Bruce Goerlich, Forest Hills, NY (US); Amir Yazdani, Portland, OR (US)

(73) Assignee: Rentrak Corporation, Portland, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 15/470,075

(22) Filed: Mar. 27, 2017

(65) Prior Publication Data
US 2017/0201796 A1   Jul. 13, 2017

Related U.S. Application Data

(63) Continuation of application No. 14/133,067, filed on Dec. 18, 2013, now Pat. No. 9,609,386.
(Continued)

(51) Int. Cl.
| | |
|---|---|
| *G06Q 50/00* | (2012.01) |
| *H04H 60/33* | (2008.01) |
| *H04H 60/66* | (2008.01) |
| *H04N 21/45* | (2011.01) |
| *H04N 21/422* | (2011.01) |

(Continued)

(52) U.S. Cl.
CPC ....... *H04N 21/44222* (2013.01); *G06Q 50/01* (2013.01); *H04H 60/33* (2013.01); *H04H 60/66* (2013.01); *H04N 21/4524* (2013.01); *H04N 21/4532* (2013.01); *H04N 21/462* (2013.01); *H04N 21/466* (2013.01); *H04N 21/4622* (2013.01); *H04N 21/4788* (2013.01); *H04N 21/6582* (2013.01)

(58) Field of Classification Search
CPC ........... H04N 21/44222; H04N 21/466; H04N 21/4622; H04N 21/4524; H04N 21/4532; H04N 21/462; H04N 21/4788; H04N 21/6582; G06Q 50/01; H04H 60/33; H04H 60/66
See application file for complete search history.

(56) References Cited

U.S. PATENT DOCUMENTS

| | | |
|---|---|---|
| 8,959,540 B1 | 2/2015 | Gargi |
| 2007/0198327 A1 | 8/2007 | Yazdani |

(Continued)

*Primary Examiner* — Benjamin R Bruckart
*Assistant Examiner* — Aklil M Tesfaye
(74) *Attorney, Agent, or Firm* — Baker & Hostetler LLP

(57) ABSTRACT

Various embodiments disclose a system and methods for media content analysis based at least in part upon social media data. In some embodiments, a computer system may determine a viewership associated with a selected piece of televised content such as a television show or advertisement. The computer system may also identify social media data such as social media messages associated with the selected piece of televised content. The computer system may calculate an audience engagement measurement corresponding to the selected piece of televised content based upon the social media data and the viewership.

17 Claims, 7 Drawing Sheets

Related U.S. Application Data

(60) Provisional application No. 61/738,978, filed on Dec. 18, 2012.

(51) Int. Cl.
*H04N 21/462* (2011.01)
*H04N 21/466* (2011.01)
*H04N 21/658* (2011.01)
*H04N 21/4788* (2011.01)
*H04N 21/442* (2011.01)

(56) References Cited

U.S. PATENT DOCUMENTS

| | | |
|---|---|---|
| 2012/0079518 A1 | 3/2012 | Wan |
| 2012/0117581 A1 | 5/2012 | Curtis |
| 2012/0150958 A1* | 6/2012 | Besehanic .......... G06Q 30/0201 709/204 |
| 2012/0192214 A1 | 7/2012 | Hunn |
| 2012/0215903 A1* | 8/2012 | Fleischman ........ G06Q 30/0201 709/224 |
| 2012/0260280 A1 | 10/2012 | Harsh |
| 2012/0278828 A1 | 11/2012 | Yazdani |
| 2012/0284343 A1 | 11/2012 | Lee |
| 2013/0014148 A1 | 1/2013 | Vinson |
| 2013/0074109 A1 | 3/2013 | Skelton |
| 2013/0117773 A1 | 5/2013 | Davies |
| 2013/0232159 A1* | 9/2013 | Daya ..................... G06Q 50/01 707/758 |
| 2014/0245337 A1* | 8/2014 | Gildfind ................ H04H 60/32 725/16 |
| 2015/0089523 A1 | 3/2015 | Volovich |

* cited by examiner

SYSTEM AND METHODS FOR ANALYZING CONTENT ENGAGEMENT IN CONJUNCTION WITH SOCIAL MEDIA

CROSS REFERENCE TO RELATED APPLICATIONS

This application is a continuation of U.S. patent application Ser. No. 14/133,067, filed Dec. 18, 2013, which claims the benefit of U.S. Provisional Patent Application No. 61/738,978, filed Dec. 18, 2012, both of which are incorporated by reference herein in their entirety.

BACKGROUND

The popularity of social media has grown rapidly in recent times. For example, a few years ago social media was considered an esoteric novelty, used by only a few early technology adopters. In contrast, today the rate of content generation for the social media service provider Facebook alone exceeds one billion messages per day.

This explosive growth trend has caught the advertising industry substantially off guard. As a result, many in the industry are not able to effectively and advantageously utilize this rich new resource of user-generated content. For example, television shows are still judged by metrics such as television rating points, which fail to account for differences in viewer engagement levels from one show to another. As a result, less than optimal decisions are made regarding which television programs should be maintained, which should be cut, at what time the programs should be disseminated to the viewing audience, and the prices that should be charged for the commercials.

Accordingly, an opportunity exists for developing new techniques to more effectively evaluate and analyze audience engagement levels for various televised content. The need exists for a system and methods that overcome the above problems, as well as provide additional benefits. Overall, the examples herein of some prior or related system and their associated limitations are intended to be illustrative and not exclusive. Other shortcomings of existing or prior systems will become apparent to those of skill in the art upon reading the following Detailed Description.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

Figure 1:
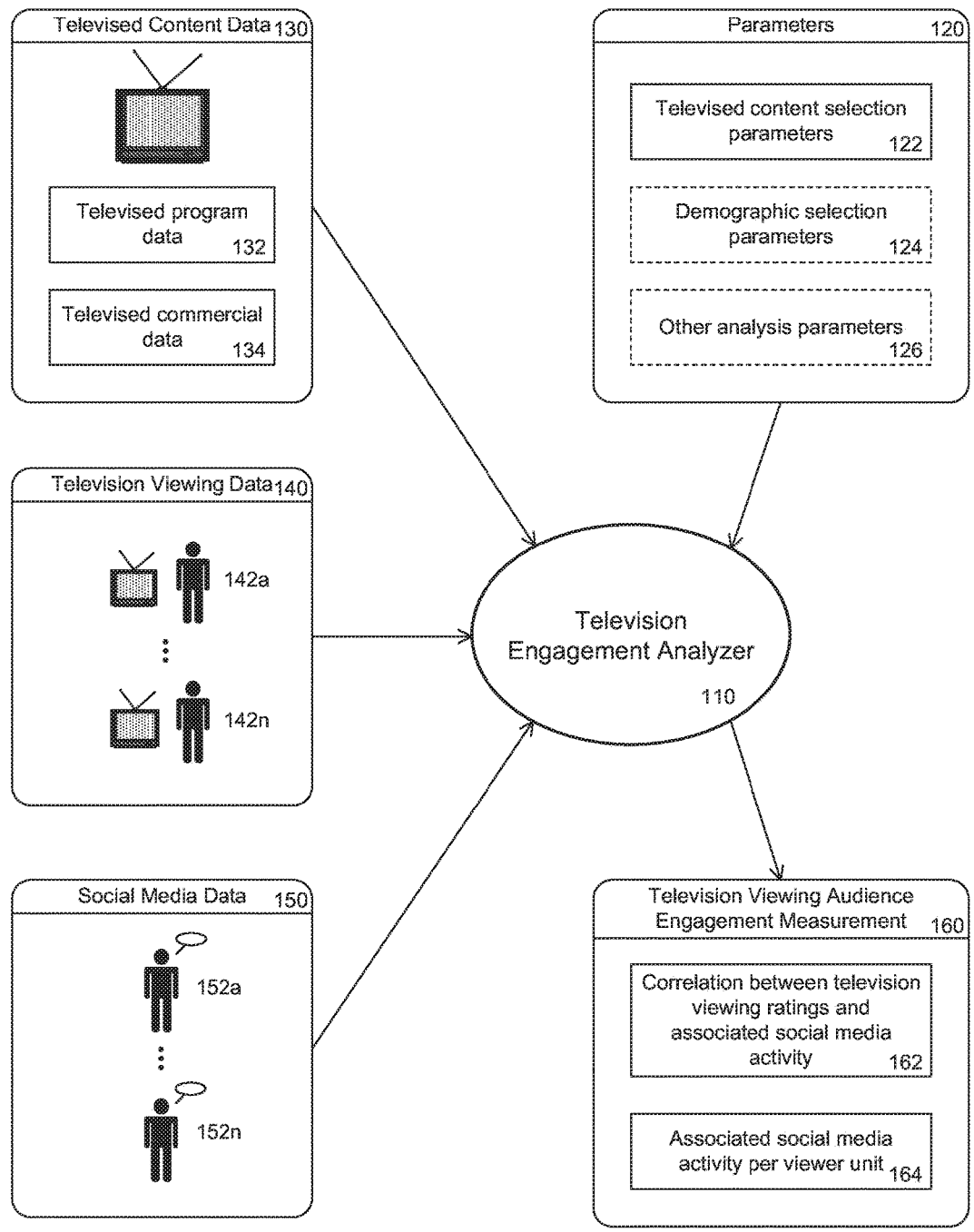
FIG. 1 is a data flow diagram illustrating various types of data that a television engagement analyzer receives as input, and one or more viewing engagement measurements being output by the analyzer as may occur in some embodiments.

The headings provided herein are for convenience only and do not necessarily affect the scope or meaning of the claimed embodiments. Some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments as defined by the appended claims.

DETAILED DESCRIPTION

Overview

A television engagement analyzer that calculates a viewing audience engagement measurement for specified televised content using social media data, e.g., social media messages, as part of the analysis, is disclosed herein. In some embodiments, the calculation can be performed by comparing or correlating a number of social media messages (e.g., messages generated on social media services) associated with the specified televised content by a number of viewers who watched the specified televised content. The comparison can involve a ratio or other statistical means to compare or correlate the two numbers (e.g., signal processing and correlation determination methods). In some embodiments, the analyzer uses television viewing data to determine the number of viewers who watched a specified televised content. In some embodiments, the analyzer can utilize televised content data to determine criteria for filtering the social media messages. The criteria for filtering can include keywords, times, or locations. One or more factors may be weighted in some embodiments so that it is accorded greater or less deference (e.g., a term unique to the content appearing in the message will be given more weight than a more generic term). The analyzer can filter social media messages that are associated with the specified televised content, and can furthermore analyze the social media messages in terms of content or sentiment as described in greater detail herein.

Various embodiments of the disclosed technology will now be described with reference to the figures. The following description provides specific details for a thorough understanding and enabling description of these embodiments. One skilled in the art will understand, however, that the invention can be practiced without many of these details. Additionally, some well-known structures or functions may not be shown or described in detail, so as to avoid unnecessarily obscuring the relevant description of the various embodiments.

The terminology used in the description presented herein is intended to be interpreted in its broadest reasonable manner, even though it is being used in conjunction with a detailed description of certain specific embodiments of the invention. Certain terms may even be emphasized herein; however, any terminology intended to be interpreted in any restricted manner will be overtly and specifically defined as such in this Detailed Description section.

Analyzer

FIG. 1 is a data flow diagram illustrating various types of data that a television engagement analyzer 110 can receive as input. FIG. 1 additionally illustrates one or more viewing engagement measurements 160 that are output by the analyzer. The types of data that the analyzer 110 can receive as input include: televised content data 130 (which can include televised schedule data and/or data about advertisements shown in conjunction with televised content), television viewing data 140, and social media data 150. Television viewing data is data reflecting the viewing behavior of users of the televised content, such as data that can be derived from set top boxes, smart televisions, or streaming content providers. As will be described in additional detail herein, social media data is data from social media services such as Facebook® or micro-blogging services such as Twitter® that reflects current user topics of conversation, including comments regarding televised content. The social media data may be supplemented by information regarding the user, such as geographic location, demographics, past social media activity, and so forth.

Additionally, the television engagement analyzer 110 accepts one or more parameters 120, such as televised content selection parameters 122, demographic selection parameters 124, and/or other analysis parameters 126. In some embodiments, the parameters 120 can be provided by a human operator and instruct the analyzer 110 on how to perform a desired analysis. The human operator can indicate televised content selection parameters 122 to specify which televised content the analyzer should use to analyze audience engagement. The human operator can utilize a user interface, such as a computer terminal, to specify the analysis parameters 120. The user interface can be part of a Web application, a Web site, a standalone application on a computer, etc. In some embodiments, an automatic algorithm can specify parameters rather than rely upon user input. For example, the analyzer can iterate through each television program or advertisement in a list of programs or advertisements one or more at a time, looking for specific keywords that can then be used to specify the social media data with which to be compared.

The televised content data 130 includes data about one or more televised programs 132, one or more televised advertisements 134, or a combination of the two. This data may be generated by a television set-top box or other hardware that detects the change of a channel or other user interaction with the television. The data so produced may contain, e.g.: (a) a unique identifier of the television or other viewing device, (b) a date/time stamp, and (c) a content identifier such as a channel number or network name. Additionally, there may be data regarding the use of a Digital Video Recorder or other time-shifting device, and the viewing data may be further supplemented by a household identifier, a geographic location (such as ZIP code), and/or demographics about the viewer or the household. The data may be plain Text, encoded binary format, or XML or other format. The analyzer 110 can select the appropriate televised content data 130 that corresponds to the televised content selection parameters 122.

In some embodiments, portions or all of the televised content data 130 can be provided by an external provider for analysis by the engagement analyzer 110. The data can be periodically received by the analyzer 110, or the analyzer can access one or more external databases to retrieve the data. The analyzer 110 can obtain televised content data 130, e.g., in the form of "as-run logs" provided by television distributors, data from advertisement schedule providers or from program schedule providers, or from other third-party databases, such as from IMDb.com (the Internet Movie Database service) affiliated with Amazon.com, Inc. of Seattle, Wash.

The television viewing data 140 contains information about the viewing behavior of multiple viewing entities 142a-142n. For example, the television viewing data 140 can be derived, transmitted, or collected from television set top box viewing data. In various aspects, each viewing entity 142a-142n can be a household, an individual, a particular display screen, or the like. Indeed, there may be a large number of viewing entities, e.g., thousands or millions. The viewing data can be provided from a variety of sources, for example, a television service such as a DBS (Digital Broadcast Satellite) service provider, a cable television MSO (multiple system operator), a data warehouse or other third party, and so on. Additional details regarding collection and processing of set top box viewing data can be found in U.S. patent application Ser. No. 13/543,770, filed on Jul. 6, 2012, published on Jan. 10, 2013 as U.S. Patent Application Publication No. 20130014148, entitled "Aggregation-Based Methods for Detection and Correction of Television Viewership Aberrations," the content of which is hereby incorporated by reference in its entirety.

The social media data 150 contains messages and other content that is posted or provided to social media services by entities 152a-152n, The social media data can be provided to the television engagement analyzer 110 by one or more social media services, such as Facebook, Inc. of Menlo Park, Calif.; or Twitter, Inc. of San Francisco, Calif. In some embodiments, multiple social media services will be aggregated together, for example, when the analyzer 110 accesses the data from multiple different sources. The social media data 150 can include user-generated content, such as message posts (e.g., Facebook® wall posts), Twitter® feeds or "tweets," comments, other textual content, uploaded media such as pictures, video clips, Web log contents, and so on (collectively referred to herein as "social media messages"). In some aspects, social media data can be provided by a third-party social media aggregation and analysis service.

Social media data 150 is typically vast, encompassing a wide range of topics, of which television-related content is only a fraction. The analyzer 110 can use the televised content data 130 to identify a portion of the social media data 150 that is relevant to the televised content being analyzed. The analyzer 110 uses various criteria to identify the social media content that is related to the televised content. Such criteria may include, but is not limited to: a location where the television viewing occurred; a time when the televised content was viewed; and keywords associated with the televised content. The analyzer uses the criteria to identify the portion of the social media data 150 that is likely associated with the televised content. As will be explained in greater detail below, the analyzer 110 in some embodiments can use one or more keywords, associated time stamps, and associated locations of the social media data 150 to determine which of the social media content matches, correlates with, or corresponds to the televised content being analyzed. In some embodiments, social media data can be obtained from a specialty television social media system, wherein users indicate explicitly what television content they are commenting on.

For privacy purposes, the social media data 150 can mask, obfuscate, or omit personal identification information to ensure privacy of users. In some embodiments, however, the sources of the social media data 150 may be directly identifiable from the data itself (e.g., the Twitter feed of a television Director) and the analyzer 110 can utilize that information to match the content, for example by keyword matching.

Television Viewing Audience Engagement Measurement

Figure 5:
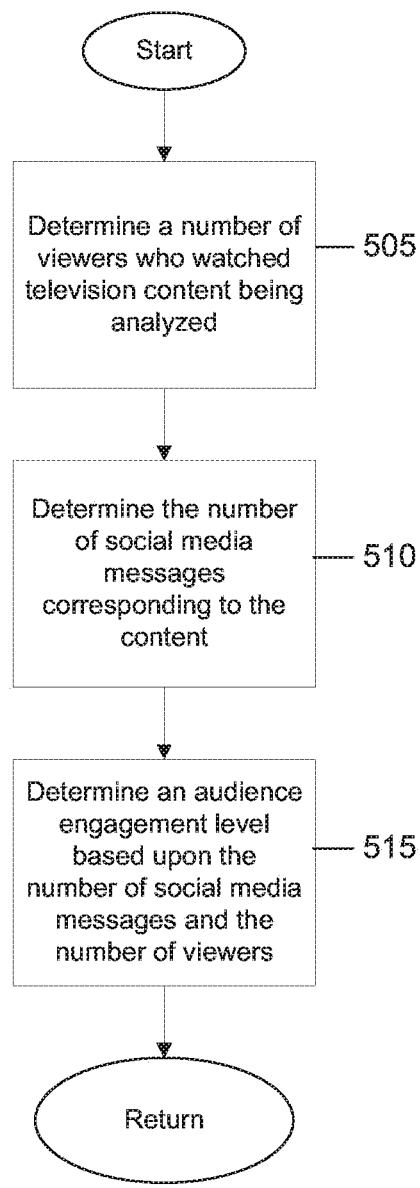
FIG. 5 is an example plot of a social media response correlated with viewership as may occur in some embodiments.

In some embodiments, the analyzer 110 produces a television viewing audience engagement measurement 160 by comparing viewership and social media messaging. For example, with reference to the process of FIG. 5, at block 505, the system may calculate (using the television viewing data 140) or access a viewership number corresponding to the television content being analyzed. For example, the system may determine a number of set top boxes tuned to a channel displaying the content at the time the content was streamed. At block 510, the system may determine the number of social media messages corresponding to the television content being analyzed. For example, the system may apply filtering criteria to a plurality of social messages (for example, Twitter® feeds or "tweets,") to identify messages whose textual content pertains to the television content. In some embodiments, the system may determine if clips or screenshots of the content are being exchanged between the social media users. At block 515, the system may determine an audience engagement level using the viewership number and the number of social media messages. For example, an associated social media activity per viewer unit 164 can be calculated by dividing the viewership number for a piece of content by a count of the number of corresponding social media messages associated with that piece of content. In some embodiments, correlations between the viewership number and the number of social media messages can be used to infer causal relations (e.g., whether the content or some other factor is increasing viewership as discussed with reference to FIG. 6 below).

In some embodiments, different viewer units can be utilized, e.g., a single viewing household, or 1,000 viewing households, etc., depending on the business purpose of the analysis. The analyzer 110 can also calculate other measurements using the viewership number and social media message number, such as calculating a correlation between television viewing ratings and associated social media activity. The correlation may, for example, indicate how many people generate social media messages regarding a particular television content. As another example, the analyzer 110 can calculate how many people (or alternately, what portion of people) who have watched televised content have not generated social media messages relating to that televised content. This calculated information can be useful for the content industry, advertising industry, or other producers or users to better understand the viewers' behaviors or interests, as well as various demographic relations.

Example Input and Output

Figure 2:
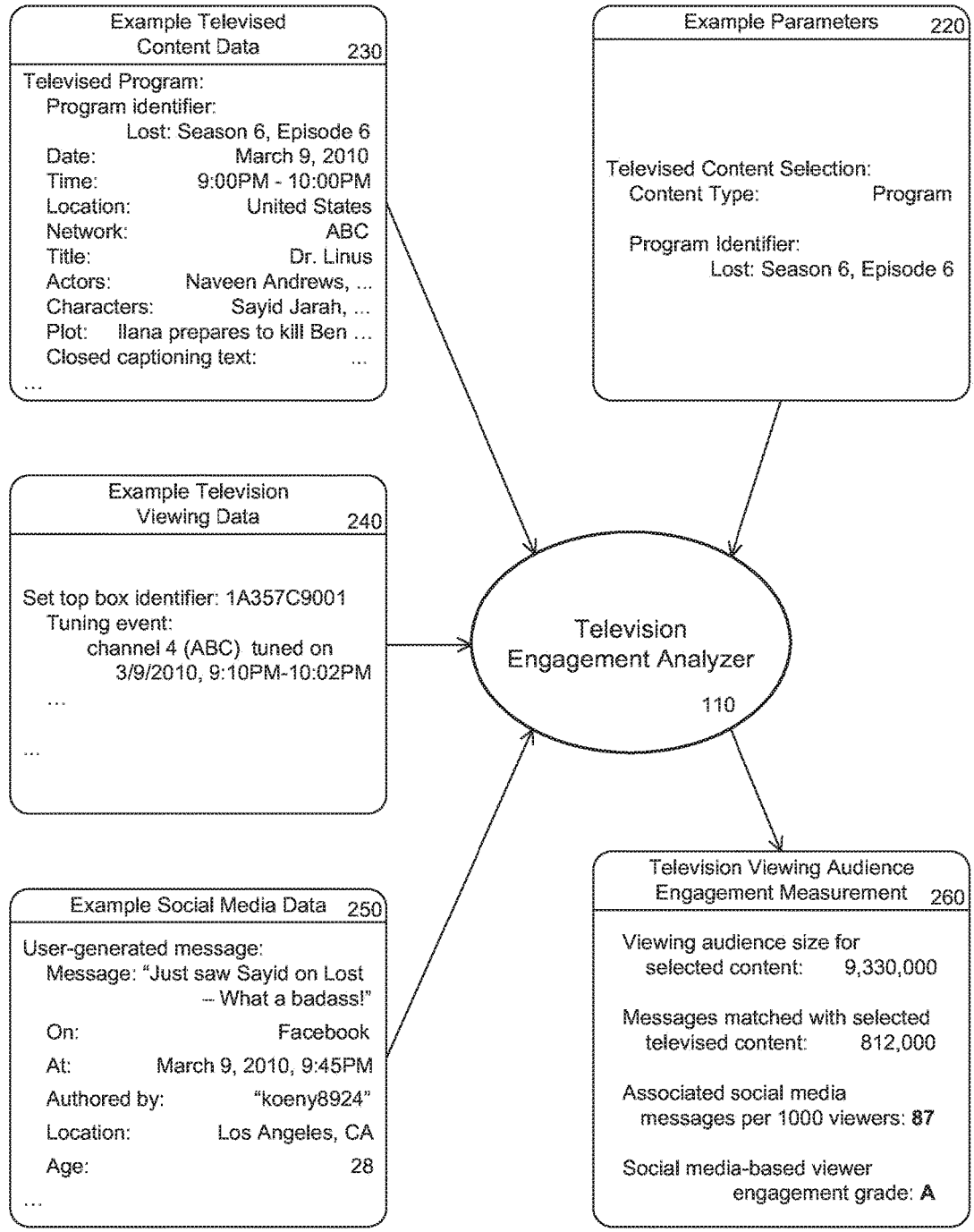
FIG. 2 illustrates example data and analysis parameters being input into the television engagement analyzer, along with a corresponding example viewer engagement measurement being output by the analyzer as may occur in some embodiments.

FIG. 2 illustrates example analysis parameters 220 and data input provided to the television engagement analyzer 110, along with a corresponding example viewer engagement measurement 260 output by the analyzer. The example analysis parameters 220 illustrated in FIG. 2 specify that the type of televised content to be analyzed is a "program". Furthermore, the example parameters 220 indicate that the particular program to be analyzed is the television show: "Lost: Season 6, Episode 6" (that is, the sixth episode of the sixth season of the television series "Lost"). Although not shown, if the program was broadcast more than once (e.g., a "rerun"), the parameters 220 can also specify which of the multiple broadcasts are desired to be analyzed. Similarly, if the program content is only shown in certain regions or television markets the parameters 220 can specify which region or market is desired to be analyzed.

The example televised content data 230 includes televised program data 132 for a program identified as "Lost: Season 6, Episode 6". The date and time of day that the example program was televised was Mar. 9, 2010, from 9:00 PM to 10:00 PM local time in this example, but may alternately be "national time" or East Coast time or any other suitable time convention. As indicated, the program has a televised duration of 1 hour. The location of the audience it was televised to was the United States, and the network it was televised on was "ABC" (the American Broadcasting Company broadcasting network). Other portions of the televised content data for this example program include the episode title ("Dr. Linus"), the program's actors ("Naveen Andrews" and others), the program's characters ("Sayid Jarah" and others), the program's plot, and the program's closed captioning text. The ellipses in this example indicate that additional data is present. This additional data, which can include additional televised program data 132 and televised commercial data 134, is not illustrated for brevity.

The analyzer 110 can determine that the televised content data 230 for "Lost: Season 6 Episode 6" is relevant for analysis because its program identifier matches that of the example parameters. The matching may be based on keywords, or by a combination of keyword, date, and time. Additionally, more sophisticated algorithms can be used to identify a match, using contextual cues 220. Based on the match, the analyzer 110 associates the televised content being analyzed with the aforementioned date, time of day, broadcast network, broadcast location, and so on. Additionally, the analyzer 110 can associate one or more keywords (such as those from the plot summary, actor's names, etc.) with the content being analyzed. In some embodiments, the analyzer can ignore commonly used words from being considered as keywords, e.g., as described in additional detail below.

The example television viewing data 240 includes a tuning event for a set top box having the identifier "1A357C9001". The tuning event indicates that on Mar. 9, 2012, at 9:10 PM, the set top box became tuned to the channel 4 (corresponding to the broadcast network "ABC"), and remained tuned to that channel until 10:02 PM. Additional tuning events and set top box identifiers are not shown for brevity in this example.

In some embodiments, television viewing data 240 can be formatted differently, or presented at a different level of detail, than displayed in FIG. 2. For example, in some embodiments the television viewing data can be already partially analyzed, such as when the data represents the aggregated tuning behavior of groups of set top boxes. Also, additional or different data can be included in the viewing data 240 besides that which is illustrated, such as a zip code, household identifier, or other location information of the viewing entity or set top box, etc. In some embodiments, rather than, or in addition to, the television viewing data being acquired from set top boxes, the viewing data can be acquired by using "peoplemeters," and/or by the use of surveying techniques. These techniques can estimate the number of viewers of a larger population based on a sample subset of the population.

The example social media data 250 includes a social media message, e.g., a Facebook® wall posting. The representative message depicted in FIG. 2 is textual content, including the name of the series being analyzed ("Lost"), and the name of a character on the series ("Sayid"). In this example, the analyzer 110 can match keywords from the example televised content data 230 and the example parameters 220 to determine whether the social media content corresponds to the televised content being analyzed. The analyzer 110 can also analyze the time at which the message was generated ("Mar., 9, 2010", 9:45 PM) to determine whether the message time is within or near the time of the television broadcast content being analyzed (Mar. 9, 2010, 9 PM-10 PM). The analyzer can also analyze the location associated with the message ("Los Angeles, Calif.") with the location of the market where the television content was televised ("United States") determine whether the message originated in a market where the content was actually being shown Although the program is illustrated as being broadcast at the same time, sometimes programs are broadcast at different times in different markets or time zones (e.g., "Central", "Eastern", and "Western" markets may be broadcast at different times). The analyzer 110 can take these different broadcast events into consideration by adjusting the parameters used to match social media events to television content.

The example social viewing audience engagement measurement area 260 illustrates some intermediate values which can be calculated by the analyzer in some embodiments ("viewing audience size . . . " and "messages matched . . . "), in addition to an example associated social media activity per viewer unit 164 calculation, and a corresponding engagement "grade" or "index". In this example, the system calculated 87 associated social media messages per 1000 viewers by dividing 812,000 matched social media messages by a 9,330,000 viewing audience size, and multiplying the result by the viewer unit, which is 1,000 viewers in the depicted example.

In this example, the system awards a social media-based engagement grade of "A". The analyzer 110 can assign an engagement grade by determining within which one of multiple grading brackets the social media messages per viewer unit fits. For example, the system can quantize the social media messages per viewer value based on the number of available grades. In this example, the letter grade of "A" can have certain minimum and maximum values, below or above which a different grade would have been assigned. The bracket boundary values for the various grades can be determined empirically, based on a wide range of televised programs and/or commercials, so that an assigned grade concisely, meaningfully, and/or accurately conveys the engagement level of an average viewer of the televised content being analyzed in relation to the engagement levels of the wide range of content. For example, a "C" grade can be empirically defined to convey a social media-based engagement level that is approximately average. The grades may be assigned, for example, using a statistical analysis of past data for a given set of bench-mark or baseline cases.

Viewing Engagement Calculation Process

Figure 3:
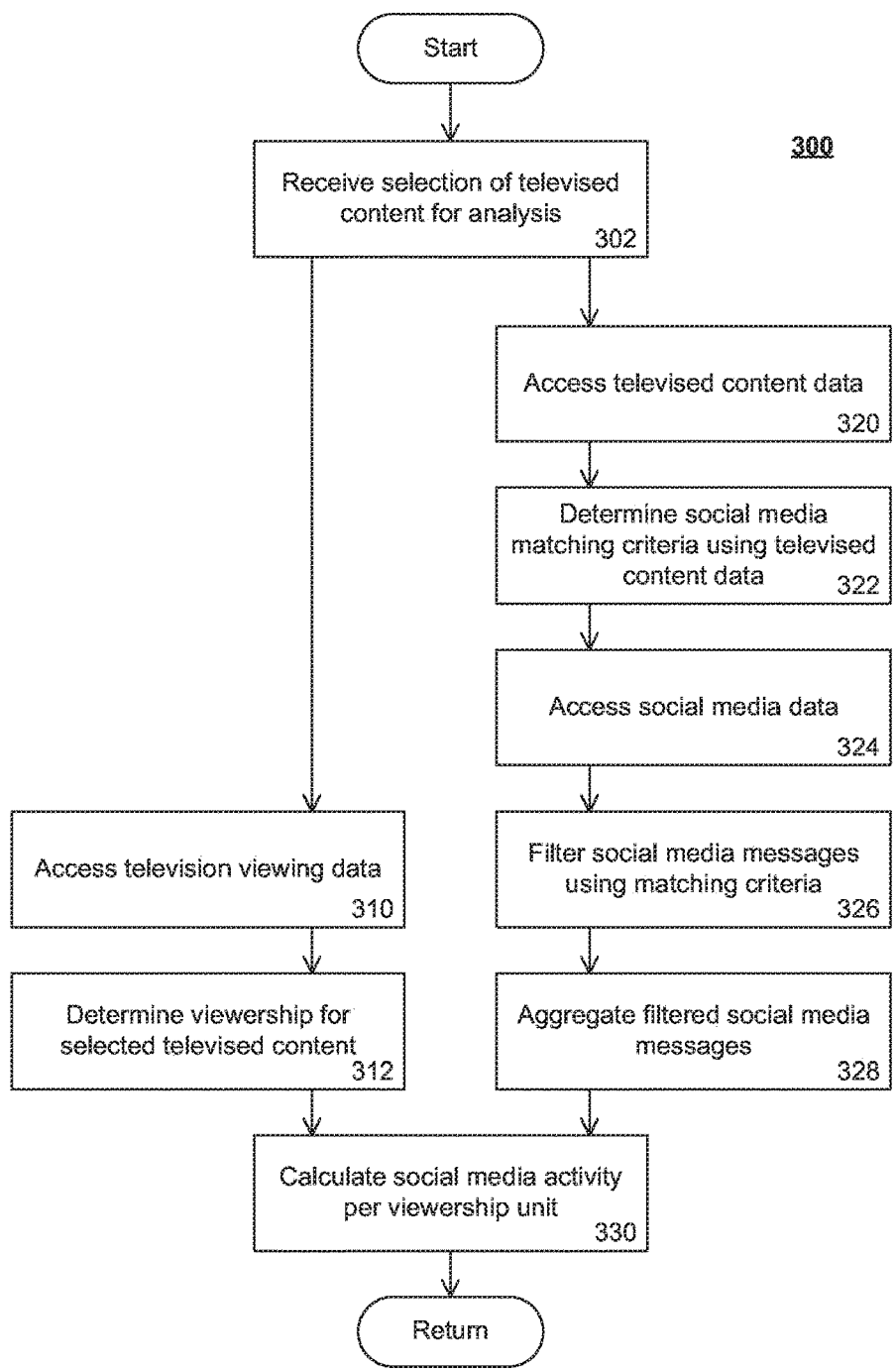
FIG. 3 is a process flow diagram illustrating steps that the television engagement analyzer can take to calculate a viewing engagement measurement as may occur in some embodiments.

FIG. 3 is an example process flow diagram illustrating steps 300 for calculating a viewing engagement measurement that is performed by the analyzer 110. Processing begins at block 302, where the analyzer receives/acquires a selection of televised content for analysis. Processing can then continue in parallel to blocks 310 and 320.

At block 310, the analyzer accesses the television viewing data 140 in order to determine the viewers who watched the selected televised content. Although not shown, the analyzer can also access the televised content data 130 to make this determination. At block 312, the analyzer determines viewership for the selected televised content using the accessed television viewing data, e.g., by counting the number of viewers corresponding to the selected televised content.

In parallel (or serially), at block 320, the analyzer accesses the televised content data 130. At block 322, the analyzer determines the matching criteria (e.g., time, or day and time of day, keywords, location) that is to be used to analyze the social media data. As noted herein, different techniques can be utilized for matching the social media messages with the selected content. At block 324, the analyzer accesses the social media data 150. The social media data 150 is then filtered by the analyzer in step 326 using the matching criteria. The filtering can be performed to determine which social media messages correspond to the televised content selected in block 302.

At block 328 the filtered (or matched) social media messages are then aggregated by the analyzer. In some aspects, social media messages can be partially matched (meaning that it doesn't fully satisfy all of the matching parameters), or matched with a corresponding confidence score. This score can estimate the confidence in the match by the analyzer. In some embodiments, a minimum confidence score can be specified in the other analysis parameters 126 and the analyzer will discard any matches that do not exceed the minimum confidence score. In some embodiments, the filtered social media messages can be weighted by the analyzer according to their confidence, so that, for example, a message matched with low confidence is only counted partially, while a message matched with high confidence is counted fully. Processing then proceeds to block 330, where the analyzer calculates a social media activity per viewership unit 164. In some embodiments, the social media activity per viewership unit results can be used by advertisers or content channels to better understand the effectiveness or reach of certain content.

Television Engagement Analyzer Components

Figure 4:
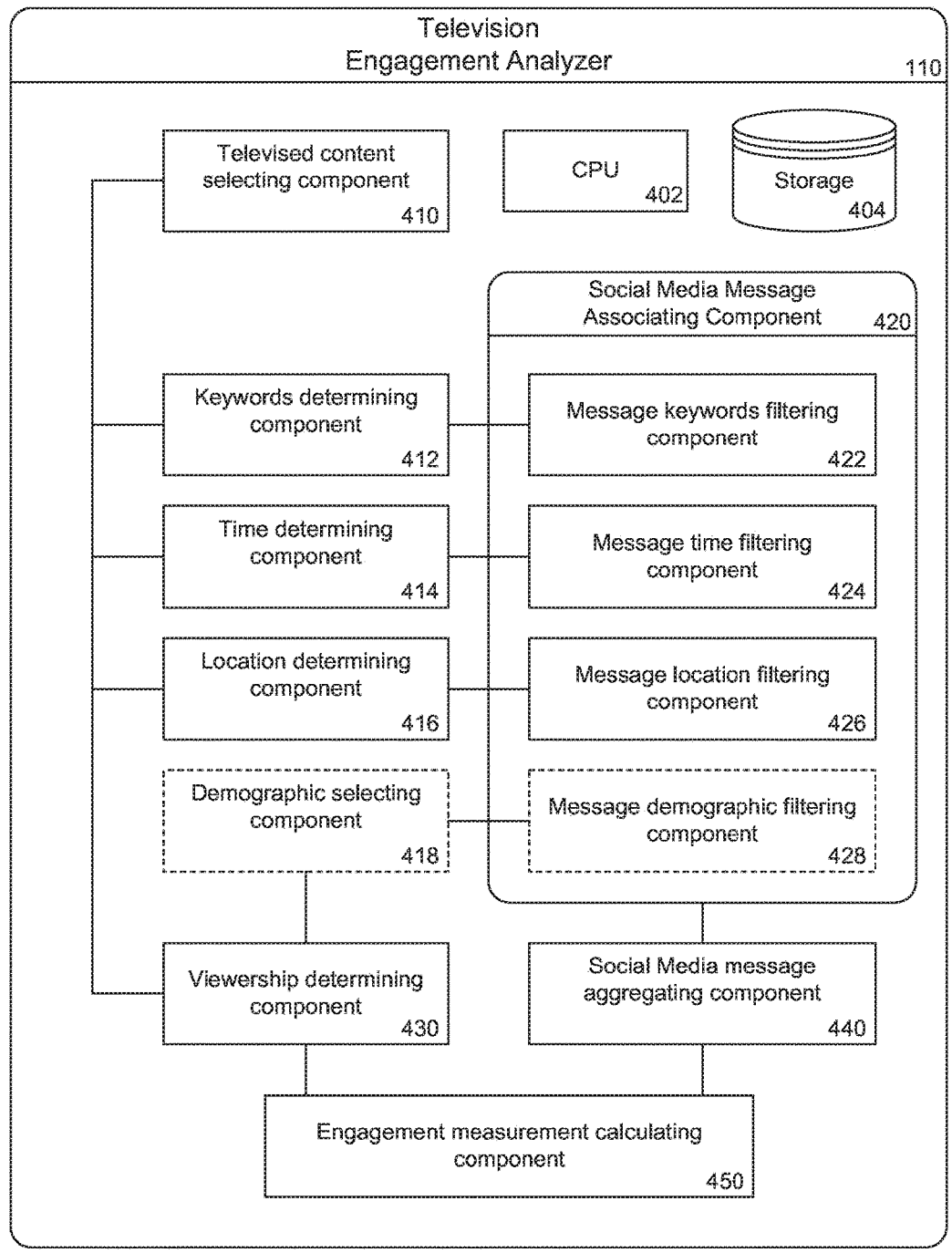
FIG. 4 is a block diagram detailing components of the television engagement analyzer of as may occur in some embodiments.

FIG. 4 is a block diagram detailing components of the television engagement analyzer 110 as may be implemented in some embodiments. The depicted components can be hardware, software, or firmware components and can be grouped in alternative manners than that depicted. A central processing unit 402 ("processor") is utilized by the analyzer 110, for example, to execute instructions performing some or all of the steps 302-330. The instructions can be stored on a storage device 404 (e.g., a memory, hard disk drive, etc.). The storage device 404 can additionally store data or parameters received from outside sources by the analyzer 110, to improve the performance of the analyzer. For example, the analyzer can locally cache on the storage device some or all of the data 130, 140, and 150 that it receives/acquires.

A televised content selecting component 410 selects televised content to be analyzed, e.g., in accordance with inputs received from a user interface from a human operator. In some embodiments the televised content selecting component 410 can select televised content based on the parameters 120, such as the televised content selection parameters 122 and any demographic selection parameters 126. In some aspects, the televised content selecting component 410 accesses and uses televised content data 130 to confirm, refine, or obtain additional information about the selected televised content (e.g., to allow a user to specify a program by its name, and convert this into a date, time of day, network, location, etc., of a broadcast).

The keywords selection component 412 can find keywords associated with the selected televised content. In order to find keywords that are useful for filtering social media, commonly used keywords may be skipped, or when encountered, may be combined with one or more additional keywords that are required to be present. Common keywords can be determined by applying an inverse document frequency calculation, such as one that calculates the number of message entries in the social media data 150 that refer to the term, or some variant known in the art. Semantic indexing and other algorithms can also be used. If the inverse document frequency of a keyword exceeds a predefined threshold, it may signal to the keywords determining component 412 that the keyword is not specific enough. Additional or alternate keywords may instead be found and utilized, if possible.

Alternately or additionally, the inverse document frequency can be used to assign a score to the keyword for use in computing a message's weight, such as the confidence score described above. The keywords are utilized by the message keywords filtering component for identifying a portion of the social media messages that correspond to the selected televised content. The message keywords filtering component 422 is one of other filtering components 424, 426, and 428 that the analyzer 110 can utilize in various combinations for performing the step 326 of identifying social media messages using matching criteria. Other types of matching criteria besides keywords may include: time matching criteria, location matching criteria, and demographic matching criteria.

The time matching criteria, determined by the time determining component 414, are not necessarily the same time as that when the show was transmitted, or broadcast to the viewers. Because users may generate social media messages about televised content after it is viewed (e.g., after a program broadcast has ended) or even before a program has been transmitted (e.g., in anticipation of a program that has yet to be viewed), the time determining component 414 may add a time range before and/or after the actual time or dates that the selected content was televised. For example, the time determining component 414 can determine a time criterion covering the 1 hour before or after the broadcast, the entire day of the broadcast, several days or even weeks or months before or after a broadcast, and so on. The message time filtering component 424 can then further filter the social media data 150 based on the determined time criteria.

Location matching criteria can be similarly altered, such as to increase a matching geographic boundary to account for people traveling after having watched a televised program before generating corresponding social media messages, or having a social media account associated with a location that only loosely corresponds to their actual location (e.g., a user in Piedmont, Calif. may have a social media location that only specifies "United States"). The message location filtering component 426 can apply the determined location criteria to further filter the social media data 150.

In some embodiments, the analyzer 110 infers a location associated with a social media message. For example, if a social media user has a location specified in the user's social media profile (such as a specified "home town"), this location can be inferred as the location of their generated messages. As another example, a likely location of a user who generated content can be inferred from cached network information associated with the user (e.g., a cached internet protocol address for the user from which a location can be derived, a cached cellular tower identifier for the user, or cached global positioning service ("GPS") coordinates for the user, etc.). If the user uploaded multimedia files to a social media service that is reflected in the social media data 150, the analyzer 110 can extract and utilize location information stored therein. For example, if the user captured a Joint Photographic Experts Group ("MEG") formatted image file using a digital camera, Exchangeable Image File Format ("EXIF") tags embedded inside the JPEG file could contain GPS coordinates specifying the location of the camera at the time the photo s captured, as well as the time that the photo was captured. If the user published this image file using a social media service, the analyzer 110 can extract and utilize that information to infer the location of the user at that particular time, and associate the location to some or all of the user's messages.

When requested, such as by a human operator, demographic filtering can be applied by the demographic selecting component 418 and the message demographic filtering component 428. For example, a particular age range of viewers and/or social media content authors, such as "18-24 years old" can be specified, e.g., in the demographic selection parameters 124, for analysis. This allows the human operator to analyze, compare, and contrast varying social media and television viewing activity for various audience demographics.

In some aspects, as was described above, the filtering components 422-428 can work in an additive sense, meaning that each additionally filters the social media data to be progressively smaller and smaller. In other words, the analyzer, when performing a search for social media messages matching the criteria, applies an "and" operation across the filtering criteria. In other aspects, messages filtered by each criterion are joined together, yielding an "or" operation on the criteria for the performance of a search. In some aspects, a first portion of the criteria can be processed using the "and" operation, while a second portion can be processed using the "or" operation. Alternately or additionally, all or some portion of the criteria can be processed with a "not" operation, and furthermore, the order of the operations processing may be varied, yielding many possible Boolean combinations and ways in which the filtering could be performed. The filtering may be optimized to provide good results that balance the minimization of false positives with the minimization of false negatives. A false positive is a social media message that does not correspond to televised content, e.g., is erroneously determined to correspond to that televised content. A false negative is a social media message that corresponds to televised content, but was missed (e.g., mistakenly determined to not correspond).

The social media message aggregating component 440 counts the number of social media messages identified by the component 420, and may perform other aggregation operations. The aggregating component can maintain different statistics about the social media messages, such as the number or users who generated messages, a number of messages generated, a number of viewings of identified social media messages, etc.

A viewership determination component 430 determines the viewership associated with the selected televised content, such as by accessing the television viewing data 140 and determining which of the viewing data corresponds to the selected televised content (e.g., how many viewers viewed the content). In some embodiments, different criteria can be applied to determine viewership, e.g., whether the set top box only had to tune in some portion of the televised content, or whether it had to tune in the entire duration of the televised content in order to count the viewing. In some embodiments, digital video recorder viewing (which may occur at a time after an initial broadcast), internet protocol television viewing, on-demand television viewing, and alternate video distribution technologies could be utilized by the component 430. For example, the other analysis parameters 126 can specify that time-shifted viewing resulting from digital video recorders should not be included, should not be included if viewed later than X days (e.g. 5 days) after broadcast, should be included regardless of when it was viewed, or even included exclusively (instead of "live viewing" data), and so on. The desired analysis can be specified in the other analysis parameters 126.

An engagement measurement calculating component 450 calculates one or more television viewing audience engagement measurements 160 by using the viewership determined by the component 430 in conjunction with a measurement of the social media activity aggregated by the component 440. For example, the engagement measurement calculating component 450 can calculate the "87 associated social media messages per 1000 viewers" and/or the "social media-based viewer engagement 'A' grade" illustrated in engagement measurement 260.

Some additional details regarding the analyzer 110, including the manner in which it can collect and use television viewing data, can be found in systems described in, e.g., U.S. patent application Ser. No. 11/701,959, filed on Feb. 1, 2007, published on Aug. 23, 2007 as U.S. Patent Application Publication No. 2007019832 entitled "System and Methods for Measuring, Targeting, Verifying, and Reporting Advertising Impressions"; U.S. patent application Ser. No. 13/081,437, filed on Apr. 6, 2011; published on Oct. 11, 2012 as U.S. Patent Application Publication No. 20120260280, granted on Oct. 14, 2014 as U.S. Pat. No. 8,863,166, entitled "Method and System for Detecting Non-Powered Video Playback Devices"; and U.S. patent application Ser. No. 13/096,964, filed on Apr. 28, 2011, published on Nov. 1, 2012 as U.S. Patent Application Publication No. 20120278828, granted on Apr. 15, 21314 as U.S. Pat. No. 8,701,135, entitled "Method and System for Program Presentation Analysis"; each of which is herein incorporated by reference in its entirety.

Alternate Embodiments

In some embodiments, the televised content selection parameters 122 can include other types of parameters than those illustrated in FIG. 2. For example, the parameters can specify one or more times during which the televised content for selection was presented to viewers, on which particular network or channels it was presented, and in which markets or locations it was presented. In some aspects, the televised content selection parameters 122 can specify a series of multiple programs, e.g., all episodes of "Lost, season 6", or all episodes of all seasons of Lost, or all programs presented on the broadcast network "ABC", or all programs corresponding to a particular genre, such as reality television programs, and so on.

In some embodiments, the televised content selection parameters 122 can specify one or more particular commercials (for example, "the 3rd commercial presented during the 2nd ad pod of Lost, Season 6, episode 6", or all commercials presented for a particular televised advertising campaign, and so on). The televised selection parameters can specify all content presented in a selected region, or to a selected viewer demographic, or all unique content presented by a particular television service provider.

In some embodiments, an analyzer interactively uses some of the televised content data to augment, convert, or populate some of the selection parameters. For example, the analyzer can convert the example analysis parameter 220 to instead indicate the date, time, location, and network that selects the content. These indications can assist the operator to provide appropriate analysis parameters 120.

The demographic selection parameters 124, when present, can direct the analyzer 110 to focus its analysis on a particular viewer demographic (e.g., a particular age range, household income, and the like). The other analysis parameters 126 can direct the analyzer 110 to perform the analysis using certain options (e.g., which data sources to utilize for the televised content data 130, the television viewing data 140, and the social media data 150, and other details regarding how to perform the analysis, such as which criteria to select for filtering the social media messages, how to apply those criteria when performing the filtering, whether data should be locally cached for efficient repetitive use, etc.).

In some aspects, the analyzer 110 accesses and combines data from multiple sources. For example, the analyzer 110 can access the data over a network, such as the internet, or on a computer-readable medium, such as a CD-ROM or hard disk, etc. In some aspects, the analyzer 110 utilizes one or more application programming interfaces ("APIs") to programmatically interface with an external or third-party library or service that provides all or portions of the various aforementioned data.

In some embodiments, the message keywords filtering component 422 applies semantic processing to filter for particular meanings of a keyword based on other contents of a social media message. The message keywords filtering component can also apply term frequencies when filtering keywords and other methods for effectively filtering keywords, such as the proximity of multiple keywords appearing in a message.

In some embodiments, and when data allows, the analyzer 110 utilizes data about the viewers of the social media messages, instead of or in addition to the data about the author of the message. For example, the analyzer 110 can count the number of associated content viewings, rather than the number of associated content generations.

In some embodiments, the social media content associating component 420 utilizes other criteria, instead of or in addition to those discussed above, for determining associated social media content. For example, if a section, subdivision, forum, or the like, is established for the purpose of discussing a particular television show, then the purpose of the forum can be taken into account. For example, if a forum is established for discussing the television series "Lost", then all user generated content on that forum (e.g., new threads, responses, optionally including those within any subforums) can be considered to be associated with that television series. (Alternately, the keyword "Lost" may be automatically attributed to each message board post, in order to raise the chances that the posts will be matched if the keywords determining component 412 determines that keyword.)

The analyzer 110 can be used to analyze social media interest relating to movie trailer viewings, such as to allow studios to gauge interest in an upcoming movie, predict demand for the upcoming movie, and adjust advertising campaigns.

In some embodiments, the social media message aggregating component 420 performs other aggregation operations besides counting the social media messages associated by the component 420. For example, it can apply weights when performing a count on the aggregated group to bias some messages (e.g., those that are more reliable or more certain to be associated) higher than others. As another example, it may determine a cumulative number of viewings of the aggregated content, or may perform statistics on the characteristics of the messages, such as to determine from which social media service most came, or to otherwise further analyze the data.

In some embodiments, the analyzer 110 may simply count relevant social media messages. In some embodiments, it can also analyze the sentiment of the messages, whether they are estimated to be "positive" or "negative" comments about the television content.

In some embodiments, the analyzer 110 creates reports, charts, or graphics that include one or more of the measurements 160. The reports, charts, or graphics can be delivered on printed media or non-transitory computer-readable media, such as a DVD or CD-ROM, or they can be accessed remotely using a network, such as the Internet.

In various embodiments, the analyzer 110 can be used to assess the impact of social media on television audience viewing ratings, the impact on advertisement retention (e.g., the propensity of an audience to tune away of fast-forward through advertisements), the effectiveness of advertising (including both its impact to sales as well as qualitative metrics such as awareness, considerations, and purchase intent), and the probability of cross-media viewings (such as seeing something on television and then looking it up online).

Correlations and Causal Inferences

Figure 6:
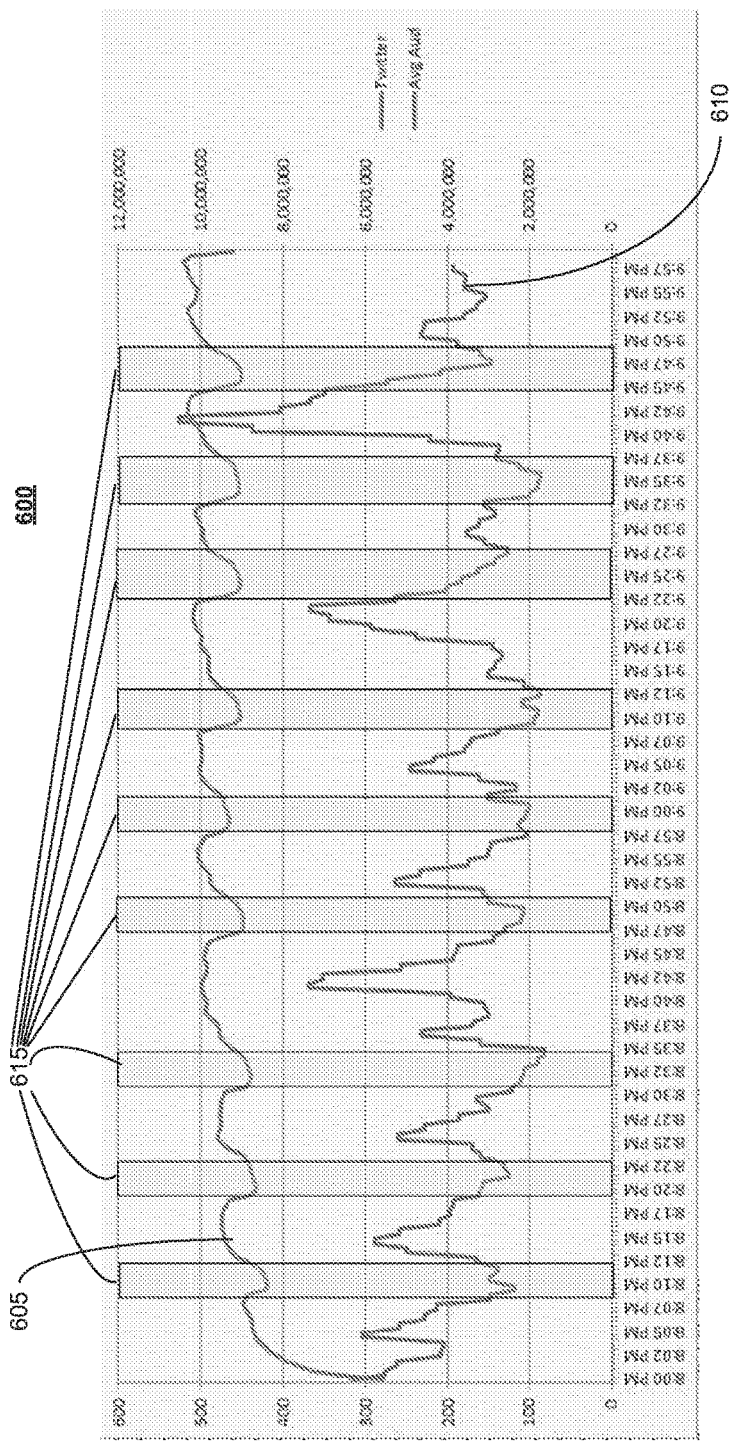
FIG. 6 is an example plot of a social media response correlated with viewership as may occur in some embodiments.

FIG. 6 is an example plot 600 of a social media response 610 correlated with viewership 605 as may occur in some embodiments. In this example, the social media response 610 includes a number of Twitter® posts determined to be related to displayed content. For example, the system may have analyzed the posts to identify keywords pertaining to the content (e.g., character names, content subject matter, content title, etc.). In this example, the content includes a "voting" period (e.g., a show such as "American Idol®" wherein viewers vote for contestants in a competition). As depicted, between 8 PM and 9:40 PM viewership 605 and the social media response 610 parallel one another in roughly a sinusoidal pattern corresponding to the content displayed between commercials 615. At 9:40 PM, a significant increase in social media activity 610 occurs, but the oscillatory pattern of the viewership 605 is generally unchanged. In this example, the deviation can be attributed to the "voting" as well as the corresponding discussion among the viewers of the content. This data indicates that although voting may generate considerable discussion regarding the content, the actual viewership of the content itself may not change during voting. Accordingly, one might infer that the value of advertising at the time of voting may be roughly the same as at early times in the program.

In contrast, in a dataset where the social media signal remains relatively consistent, but upward spikes occur aperiodically in the viewership, one may infer that the causal relation for the viewership spike is something other than referrals and commentary by existing viewers (e.g., viewers finishing dinner may have begun watching the content, or separate content on another channel may have ended such that viewers are now switching channels). Absent correlative metrics between the social media response 610 and viewership 605 an analyst may improperly construe the viewer's behavior and the behavior of the corresponding social community.

Computer System

Figure 7:
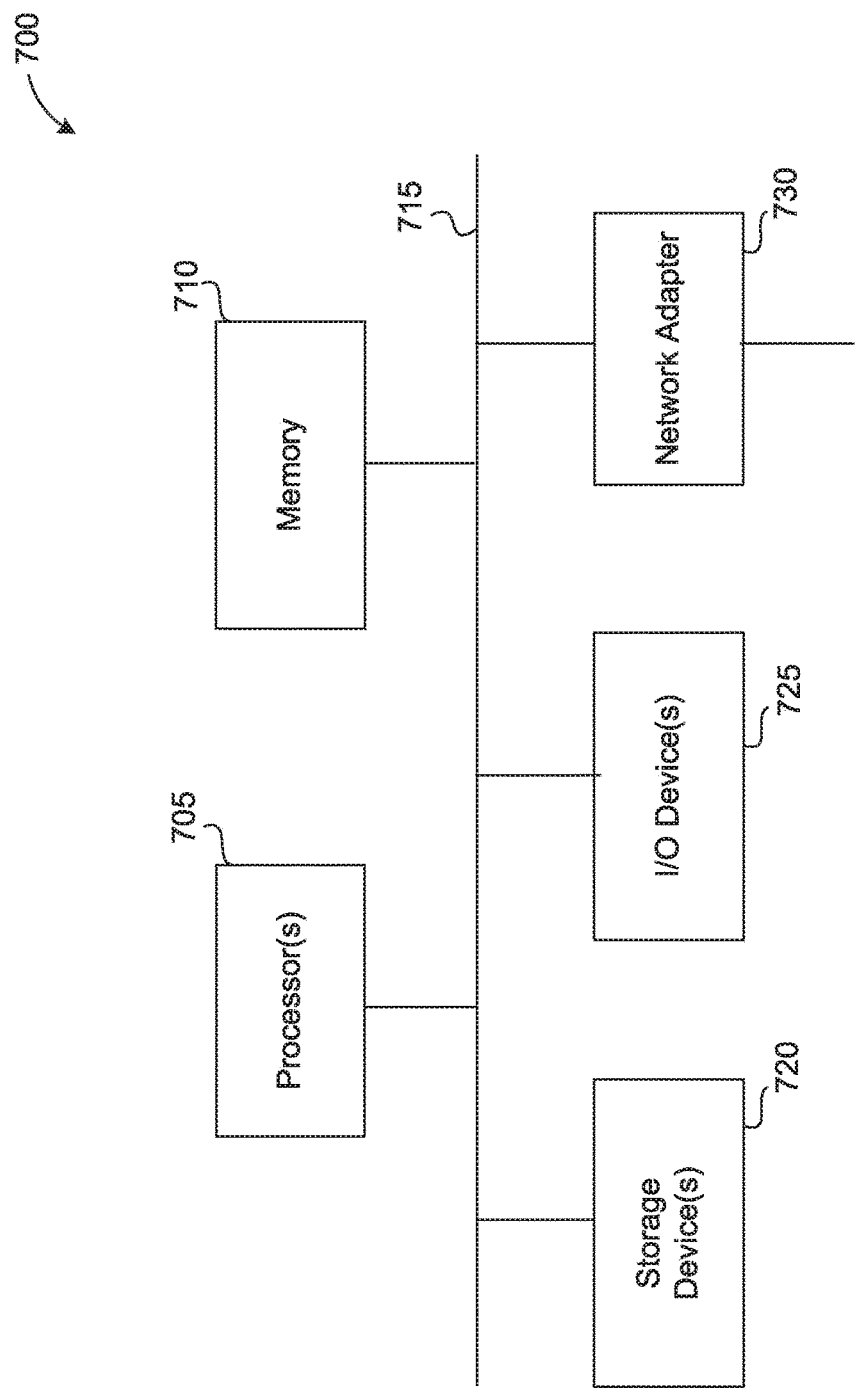
FIG. 7 is a block diagram of a computer system as may be used to implement features of some of the embodiments.

FIG. 7 is a block diagram of a computer system as can be used to implement features of some of the embodiments. The computing system 700 can include one or more central processing units ("processors") 705, memory 710, input/output devices 725 (e.g., keyboard and pointing devices, display devices), storage devices 720 (e.g., disk drives), and network adapters 730 (e.g., network interfaces) that are connected to an interconnect 715. The interconnect 715 is illustrated as an abstraction that represents any one or more separate physical buses, point to point connections, or both connected by appropriate bridges, adapters, or controllers. The interconnect 815, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), (12C) bus, or an Institute of Electrical and Electronics Engineers (IEEE) standard 1394 bus, also called "Firewire".

The memory 710 and storage devices 720 are computer-readable storage media that can store instructions that implement at least portions of the various embodiments. In addition, the data structures and message structures can be stored or transmitted via a data transmission medium, such as a signal on a communications link. Various communications links can be used, such as the Internet, a local area network, a wide area network, or a point-to-point dial-up connection. Thus, computer readable media can include computer-readable storage media (e.g., "non-transitory" media) and computer-readable transmission media.

The instructions stored in memory 710 can be implemented as software and/or firmware to program the processor(s) 705 to carry out actions described above. In some embodiments, such software or firmware can be initially provided to the processing system 700 by downloading it from a remote system through the computing system 700 (e.g., via network adapter 730).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry can be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure were given above. Note that titles subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

The invention claimed is:

1. A method, implemented by a computing system, for generating an audience engagement measurement, the method comprising:
   receiving at least one analysis parameter, the at least one analysis parameter comprising at least one of: a televised content selection parameter and a demographic selection parameter;
   selecting a piece of televised content based on the at least one analysis parameter;
   accessing televised content data associated with the selected piece of televised content;
   accessing, from a first source, television viewing data of viewing entities;
   accessing, from a second source different from the first source, social media data generated by users of social media services;
   determining, by the computing system, viewership criteria based upon the televised content data and the at least one analysis parameter;
   determining, by the computing system, a viewership associated with the selected piece of televised content based upon the viewership criteria, the determined viewership indicating a number of users that viewed the selected piece of televised content;
   determining, by the computing system, a subset of the social media data associated with the selected piece of televised content by filtering the social media data using social media matching criteria, the filtering comprising:
      comparing each of social media messages of the social media data with at least one of the social media matching criteria, the social media matching criteria determined based on the televised content data,
      determining a confidence score of a match between each of the social media messages and the at least one social media matching criteria, and
      discarding social media messages associated with confidence scores below a predefined threshold; and
   generating, by the computing system, the audience engagement measurement corresponding to the selected piece of televised content based upon the subset of social media data and the determined viewership.

2. The method of claim 1, wherein the televised content selection parameter comprises one of: a name of a televised program; a television network; and a time of a television broadcast.

3. The method of claim 1, wherein the demographic selection parameter comprises one of: an age range; a geographic location; and a household income range.

4. The method of claim 1, wherein generating the audience engagement measurement corresponding to the selected piece of televised content comprises dividing a number of social media messages in the subset of the social media data associated with the selected piece of televised content by the number of users that viewed the selected piece of televised content.

5. The method of claim 1, wherein the social media matching criteria comprise at least one of: a geographic location, a time, and a keyword; and wherein the social media messages comprise a user-generated narrative.

6. The method of claim 5, wherein the social media matching criteria further comprises a time range outside which social media messages are excluded.

7. The method of claim 5, wherein the social media matching criteria further comprises a plurality of weighted keywords corresponding to the selected piece of televised content.

8. The method of claim 1, wherein filtering the social media data further comprises weighing each of the social media messages based on the confidence score associated with each of the social media messages.

9. The method of claim 1, wherein the television viewing data comprises data from at least one of: a digital broadcast satellite service provider, a cable television provider, and an Internet service provider.

10. The method of claim 1, wherein the television viewing data comprises tuning data of television viewing devices, wherein the viewership criteria comprises at least one of: a length of time a television viewing device is tuned to the selected piece of televised content, and an amount of time during which a time-shifted viewing occurs.

11. The method of claim 1, further comprising calculating a correlation between television rating data associated with the selected piece of televised content and information associated with the subset of social media data.

12. A non-transitory computer-readable medium comprising instructions executable by at least one processor to perform a method for generating an audience engagement measurement, the method comprising:
   receiving at least one analysis parameter, the at least one analysis parameter comprising at least one of: a televised content selection parameter and a demographic selection parameter;
   selecting a piece of televised content based on the at least one analysis parameter;
   accessing televised content data associated with the selected piece of televised content;
   accessing, from a first source, television viewing data of viewing entities;
   accessing, from a second source different from the first source, social media data generated by users of social media services;
   determining viewership criteria based upon the televised content data and the at least one analysis parameter;
   determining a viewership associated with the selected piece of televised content based upon the viewership criteria, the determined viewership indicating a number of users that viewed the selected piece of televised content;
   determining a subset of the social media data associated with the selected piece of televised content by filtering the social media data using social media matching criteria, the filtering comprising:
      comparing each of social media messages of the social media data with at least one of the social media matching criteria, the social media matching criteria determined based on the televised content data,
      determining a confidence score of a match between each of the social media messages and the at least one social media matching criteria, and
      discarding social media messages associated with confidence scores below a predefined threshold; and
   generating the audience engagement measurement corresponding to the selected piece of televised content based upon the subset of social media data and the determined viewership.

13. The non-transitory computer-readable medium of claim 12, wherein the social media matching criteria comprise at least one of: a geographic location, a time, and a keyword; and wherein the social media messages comprise a user-generated narrative.

14. The non-transitory computer-readable medium of claim 12, wherein filtering the social media data further comprises weighing each of the social media messages based on the confidence score associated with each of the social media messages.

15. A computer system for generating an audience engagement measurement, the computer system comprising:
   at least one processor;
   at least one memory comprising instructions configured to be executed by the at least one processor to perform a method comprising:
      receiving at least one analysis parameter, the at least one analysis parameter comprising at least one of: a televised content selection parameter and a demographic selection parameter;
      selecting a piece of televised content based on the at least one analysis parameter;
      accessing televised content data associated with the selected piece of televised content;
      accessing, from a first source, television viewing data of viewing entities;
      accessing, from a second source different from the first source, social media data generated by users of social media services;
      determining viewership criteria based upon the televised content data and the at least one analysis parameter;
      determining a viewership associated with the selected piece of televised content based upon the viewership criteria, the determined viewership indicating a number of users that viewed the selected piece of televised content;
      determining a subset of the social media data associated with the selected piece of televised content by filtering the social media data using social media matching criteria, the filtering comprising:
         comparing each of social media messages of the social media data with at least one of the social media matching criteria, the social media matching criteria determined based on the televised content data,
         determining a confidence score of a match between each of the social media messages and the at least one social media matching criteria, and
         discarding social media messages associated with confidence scores below a predefined threshold; and
      generating the audience engagement measurement corresponding to the selected piece of televised content based upon the subset of social media data and the determined viewership.

16. The computer system of claim 15, wherein the social media matching criteria comprise at least one of: a geographic location, a time, and a keyword; and wherein the social media messages comprise a user-generated narrative.

17. The computer system of claim 15, wherein filtering the social media data further comprises weighing each of the social media messages based on the confidence score associated with each of the social media messages.

* * * * *